Dec. 4, 1956 P. A. SCHMIDT 2,772,618
LEVELING ATTACHMENT FOR CULTIVATORS
Filed Oct. 26, 1953 2 Sheets-Sheet 1
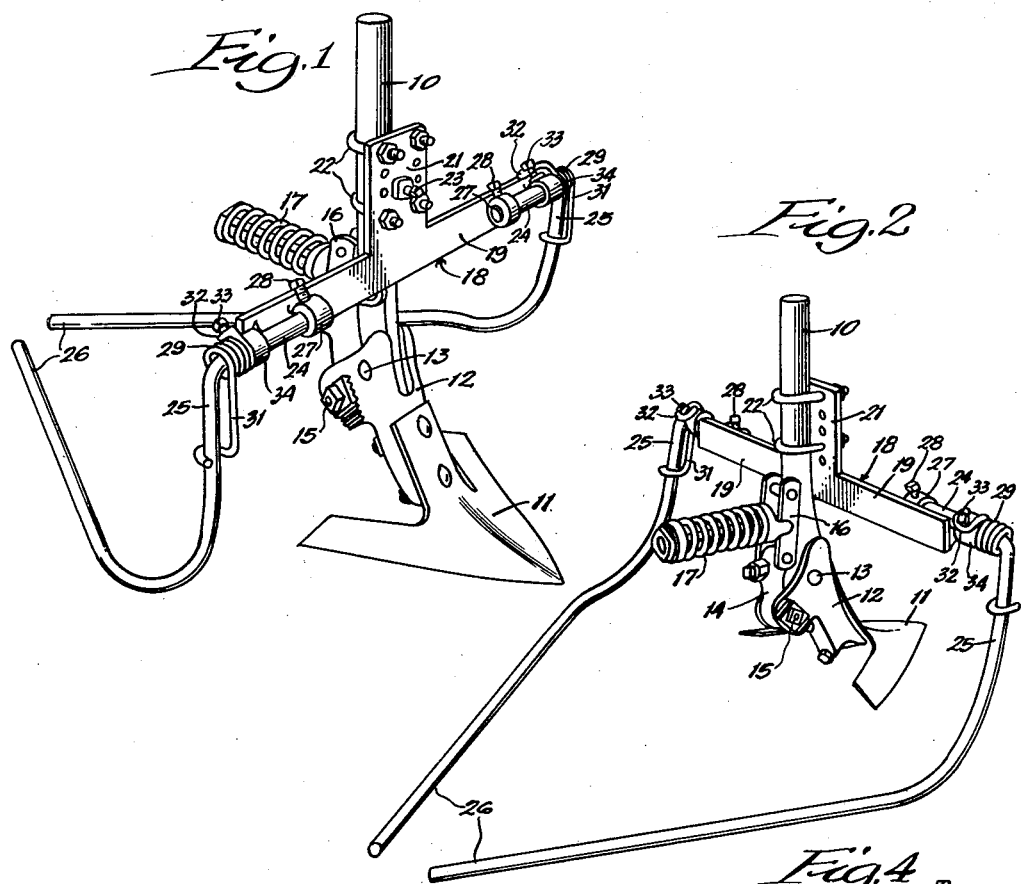
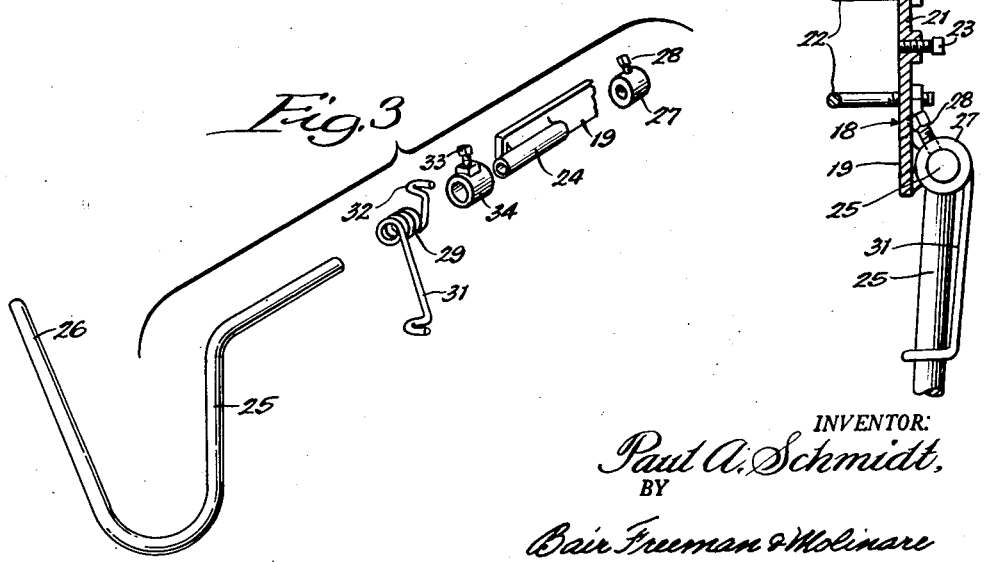
INVENTOR:
Paul A. Schmidt,
BY
Bair Freeman & Molinare
ATTORNEYS.

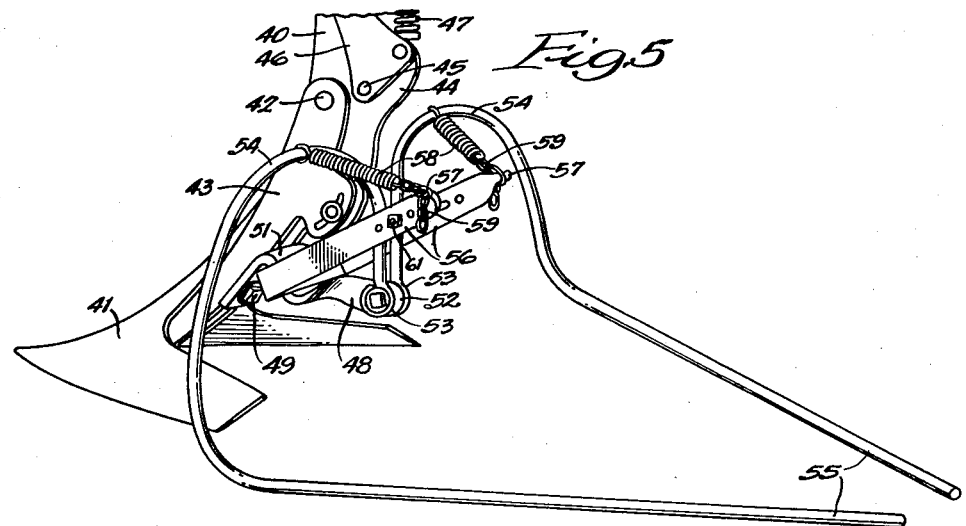
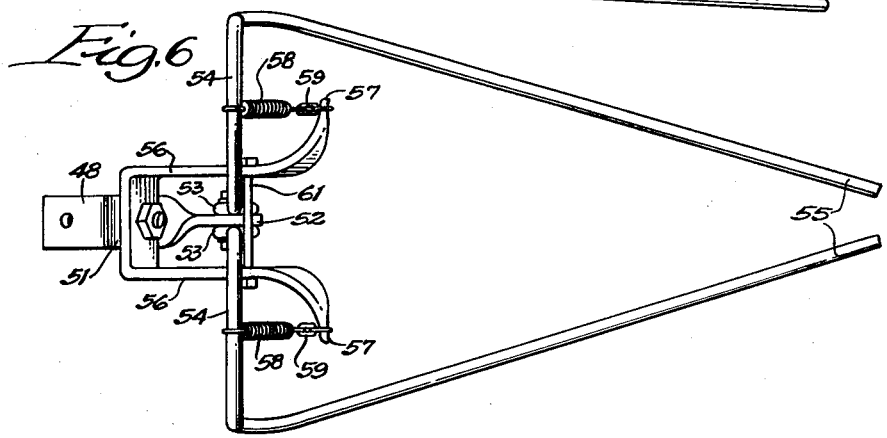
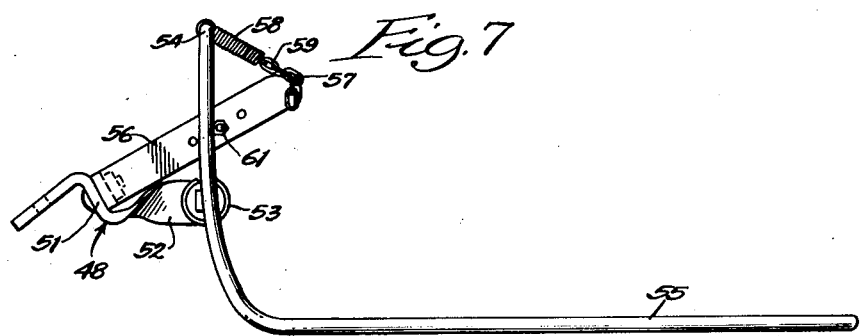

2,772,618

LEVELING ATTACHMENT FOR CULTIVATORS

Paul A. Schmidt, Mendota, Ill.

Application October 26, 1953, Serial No. 388,128

3 Claims. (Cl. 97—56)

This invention relates to leveling attachments for cultivators and more particularly to a device adapted to be attached to the shoe of a conventional cultivator to level the ground behind the shoe.

In operating cultivators, the shoe tends to leave furrows directly behind the shoe with ridges on opposite sides thereof. Such furrows in many cases form run-off channels for water and may result in a serious increase in erosion of the soil.

In addition, the furrows and ridges make cross cultivation extremely difficult not only by causing bouncing of the tractor or cultivator, but by making it difficult to maintain the shoe at a uniform depth.

It has heretofore been proposed to attach leveling arms or rods to a cultivator shoe to level the soil behind it thereby eliminating the ridges and furrows. Such rods or arms may function satisfactorily in uniform, relatively soft soil, but are apt to be displaced or bent upon striking obstacles, such as rocks, sticks, or even hard clods. After being so displaced or bent the arms cannot function properly until they are re-set or repaired. Furthermore, slight tilting of the shovel in operation may result in the arms or rods exerting either excessive or insufficient pressure on the soil to effect proper leveling.

It is one of the objects of the present invention to provide a leveling attachment in which the arms are pivotally mounted to yield upon striking an obstacle and to return to normal working position when the obstacle is passed.

Another object is to provide a leveler attachment in which the arms are resiliently urged downward to exert a constant pressure on the soil thereby to effect proper leveling under all conditions.

According to one feature of the invention, the resilient force acting on the arms is adjustable to adapt the attachment for operation with different types of soils.

A further object is to provide a leveler attachment in which downward movement of the arms is limited by positive stops to enable the cultivator to be lifted for turning and the like and to limit penetration of the soil.

The above and other objects and advantages of the invention will be more readily apparent when read in connection with the accompanying drawings, in which:

Figure 1 is a perspective view of a cultivator shovel unit wtih a leveler attachment embodying the invention attached thereto;

Figure 2 is a perspective view looking from the rear of the cultivator shoe assembly;

Figure 3 is a partially disassembled view illustrating mounting of the arms on the bracket;

Figure 4 is a central section through the bracket;

Figure 5 is a partial perspective view of a modified construction;

Figure 6 is a top plan view of the attachment of Figure 5; and

Figure 7 is a side elevation.

The attachment, as shown in Figures 1 to 4, is adapted to be attached to a conventional shovel assembly including a vertically extending supporting shank 10 which is carried by a cultivator frame and extends vertically downward therefrom. At its lower end, the shank 10 carries a conventional shovel 11 secured to a bracket 12 which is pivotally mounted on the lower end of the shank on a pivot pin 13. The shovel 12 is adapted to pivot about the pin 13 and is normally held against pivotal movement by a toggle linkage including a lower link 14 pivoted to the shovel on an axis 15 spaced from the axis 13 and an upper double link 16 pivoted on the shank and connected to the upper end of the link 14. A compression spring 17 urges the link 16 inward to hold the shoe in its normal working position but can yield to permit pivoting of the shoe about the axis 13 in the event the shoe strikes an obstacle such as a heavy stone, root, or the like.

In the operation of a cultivator shoe, as described, a furrow is left immediately behind the shovel 12 and ridges are thrown up at opposite sides of the furrow. The attachment of the present invention will level the ridges and furrow to leave a smooth, well mulched soil behind the cultivator shoe which will minimize erosion and on which the tractor or cultivator can travel smoothly for cross cultivation.

The attachment, as shown, comprises a bracket indicated generally at 18 which may be formed of flat sheet metal with transversely extending arms 19 and a vertically extending enlarged central portion 21. The central portion 21 is formed with openings to receive the ends of U-bolts 22 which fit around the shank 10 to secure the bracket tightly thereto. If desired, a set screw 23 may be provided in the central portion of the bracket to engage the shank and secure the bracket more tightly against turning thereon.

At the opposite ends of the arms 19, the bracket carries tubular bearing elements 24 which may be welded to the bracket arms, as best seen in Figure 3, to project slightly beyond the arms. The bearing elements 24 are adapted to receive the ends of arms or rods 25 which are formed with upper horizontal portions to fit rotatably into the bearing elements 24. From the bearing elements 24, the arms or rods 25 extend vertically downward and curve inward to terminate in straight end portions 26 converging at acute angle behind the shoe 12. The arms 25 may be held in place by collars 27 which are secured to the inner ends thereof by set screws 28 and which engage the inner ends of the tubular bearings 24 to limit outward movement of the arms. In addition to holding the arms in place, the set screws 28 will engage the upper edges of the bracket arms 19, thereby forming positive stops to limit swinging of the arms 25 in a downward direction. It will be seen that the collars 27 can be secured to the arms 25 in any desired angular position so that downward movement thereof can be limited to any desired position.

The arms 25 are resiliently urged downward by coil springs 29 having central coil portions to fit over the arms 25 just beyond the bearing elements 24. The springs 29 terminate at one end in extensions 31 formed at their lower ends with hooks to hook over the downwardly extending portions of the arms 25. At their opposite ends, the springs terminate in upwardly extending hook portions 32 to hook over set screws 33 carried by collars 34. The collars 34 are adapted to fit over the projecting ends of the bearing elements 24 and to be secured thereto in any desired angular position by the set screws 33. In this way, the spring pressure acting on the leveling arms 25 can be adjusted.

In operation, as the cultivator shoe moves through the ground to loosen it, it will create a furrow immediately behind the shoe with the shoe throwing up ridges on the sides of the furrow. The end portions 26 of the arms 25 will engage the soil in such ridges further pulverizing and throwing it back into the furrow to leave level, well pulverized soil following the cultivator shoe. Thus all channels which might contribute to erosion are eliminated and a level soil is left over which a tractor or cultivator can travel in a transverse direction for easy and proper cross cultivation.

Figures 5 to 7 illustrate a modified construction including a supporting shank 40 on which a cultivator shoe 41 is pivoted on an axis 42. The shoe 41 is carried by a two-part bracket 43 which is pivoted to the shank and which is pivotally connected to one end of a toggle lever 44. The upper end of the lever 44 is pivoted at 45 to the lower end of an upper toggle lever 46 which is pivoted at its upper end to the shank. A compression spring 47 anchored to the lever 44 and acting on the lever 46 tends to hold the shoe 41 in its normal cultivating position but will yield to enable the shoe to swing rearwardly upon striking an obstacle.

The leveling attachment in the embodiment of Figures 5 to 7 comprises a metal bracket 48 adapted to be bolted at one end to the shoe frame 43 by a bolt 49. The bracket 48, as best seen in Figures 6 and 7, includes a flat angular end portion to lie against the rear surface of the frame 43, a downwardly extending flat portion 51 immediately to the rear of the flat surface and a twisted vertically extending portion 52 at the rear end of the bracket. A pair of arms or rods 53 are pivotally secured to the bracket portion 52 by being formed in their inner ends with eyelets 53 overlying the opposite sides of the bracket portion 52 and pivotally connected thereto by a suitable bolt or rivet. From the eyelets 52 the arms extend upwardly and then curve outwardly to form upper curved portions 54 lying above and at opposite sides of the bracket 48. The arms then curve downwardly at opposite sides of the shoe 41 and terminate in straight rearwardly converging portions 55 to engage the soil behind the shoe.

The arms are adapted to be resiliently urged downwardly and for this purpose a yoke is secured to the flat portion 51 of the bracket and is formed with a pair of rearwardly extending spaced arms 56 which extend on opposite sides of the upwardly extending portions of the arms 54. At their rearward ends the arms 56 are turned outwardly, as best seen in Figure 6, and terminate in pins 57. Springs 58 are anchored at one end to the upper portions 54 of the arms and at their opposite ends carry chains 59 which are adapted to be adjustably hooked on the pins 57 so that the spring tension can be adjusted as desired. To limit downward swinging of the leveler arms, the bracket arms 56 are connected by a pin 61 lying to the rear of the upwardly extending portions of the leveler arms. If the leveler arms tend to swing downward excessively, their upwardly extending portions will engage the pin 61 so that downward swinging thereof will be positively limited.

The construction shown in Figures 5 to 7 functions in exactly the same manner as that of Figures 1 to 4. In both cases, the converging straight portions of the leveler arms will be pressed against the soil with a substantially uniform pressure through the springs. If these arms strike an obstacle such as a stone, a stick, a large clod, or the like, they can raise up to pass over it by compressing the springs and without damaging the arms or any other part of the attachment. As soon as the obstacle is passed, the springs will urge the arms downward to their working position and the operation can be continued. When it is desired to raise the cultivator, as for turning at the end of a row, the stop means provided will prevent the arms from swinging downward excessively and will permit the entire assembly to be raised easily.

While two embodiments of the invention have been shown and described in detail, it will be understood that these are illustrative only and are not intended to be a definition of the scope of the invention, reference being had for this purpose to the appended claims.

What is claimed is:

1. A leveler attachment for a cultivator including a generally vertical supporting shank and a cultivator shoe carried by the lower end of the shank, said attachment comprising a bracket, mounting means on the bracket to secure it to the supporting shank above the shoe, a pair of arms pivoted to the bracket on opposite sides of the shank on a common horizontal axis, the arms extending downward at opposite sides of the shoe and terminating in horizontal converging end portions trailing the shoe, coil springs engaging the arms at one end and connected to the bracket at their other ends urging the arms about their pivots in a direction to move the end portions downward, and collars adjustably secured to the arms and having locking screws projecting radially therefrom to engage the bracket and limit movement of the arms in said direction.

2. A lever attachment for a cultivator including a generally vertical supporting shank and a cultivator shoe carried by the lower end of the shank, said attachment comprising a flat elongated mounting bracket, mounting means in the central part of the bracket to secure it to the supporting shank above the shoe with the ends of the bracket extending horizontally from the opposite sides of the shank, tubular horizontally aligned bearings secured to the opposite ends of the bracket, a pair of arms having one end fitting pivotally in the bearings with their opposite end portions converging behind the shoe, a collar secured to the inner end of each arm to engage the adjacent bearing and limit axial displacement of the arm, a locking screw in each collar to secure it to an arm and to engage the bracket and limit swinging of the arm in a downward direction, and springs connecting the arms and the bracket urging the arms in a downward direction.

3. A leveler attachment for a cultivator including a generally vertical supporting shank and a cultivator shoe carried by the lower end of the shank, said attachment comprising a flat elongated mounting bracket, mounting means in the central part of the bracket to secure it to the supporting shank above the shoe with the ends of the bracket extending horizontally from the opposite sides of the shank, tubular horizontally aligned bearings secured to the opposite ends of the bracket, a pair of arms having one end fitting pivotally in the bearings with their opposite end portions converging behind the shoe, a collar secured to the inner end of each arm to engage the adjacent bearing and limit axial displacement of the arm, a locking screw in each collar to secure it to an arm and to engage the bracket and limit swinging of the arm in a downward direction, coil springs coiled around the arms adjacent to the bearings and anchored at one end to the arms, and collars adjustably secured to the bearings to which the opposite ends of the springs are anchored.

References Cited in the file of this patent

UNITED STATES PATENTS

| | | |
|---|---|---|
| 1,015,756 | Donald | Jan. 23, 1912 |
| 1,444,496 | Connelly | Feb. 6, 1923 |
| 2,136,851 | Jess | Nov. 15, 1938 |
| 2,307,533 | Neumann | Jan. 5, 1943 |
| 2,424,014 | Bobeldyk | July 15, 1947 |
| 2,483,204 | Johnson et al. | Sept. 27, 1949 |
| 2,561,854 | Goodspeed | July 24, 1951 |